US010374500B2

(12) United States Patent
Kurronen et al.

(10) Patent No.: US 10,374,500 B2
(45) Date of Patent: Aug. 6, 2019

(54) PERMANENT MAGNET MACHINE

(71) Applicant: THE SWITCH DRIVE SYSTEMS OY, Lappeenranta (FI)

(72) Inventors: Panu Kurronen, Lappeenranta (FI); Markus Silventoinen, Lappeenranta (FI); Jussi Puranen, Lappeenranta (FI)

(73) Assignee: THE SWITCH DRIVE SYSTEMS OY, Lappeenranta (FI)

( * ) Notice: Subject to any disclaimer, the term of this patent is extended or adjusted under 35 U.S.C. 154(b) by 251 days.

(21) Appl. No.: 15/528,398

(22) PCT Filed: Mar. 31, 2016

(86) PCT No.: PCT/FI2016/050200
§ 371 (c)(1),
(2) Date: May 19, 2017

(87) PCT Pub. No.: WO2016/162595
PCT Pub. Date: Oct. 13, 2016

(65) Prior Publication Data
US 2017/0331337 A1    Nov. 16, 2017

Related U.S. Application Data

(60) Provisional application No. 62/145,225, filed on Apr. 9, 2015.

(51) Int. Cl.
*H02K 16/02* (2006.01)
*H02K 1/27* (2006.01)
(Continued)

(52) U.S. Cl.
CPC ............... *H02K 16/02* (2013.01); *B63J 3/02* (2013.01); *F01D 5/066* (2013.01); *H02K 1/278* (2013.01);
(Continued)

(58) Field of Classification Search
CPC ........ H02K 1/278; H02K 1/30; H02K 21/029; H02K 1/2753; H02K 1/28; H02K 2213/09;
(Continued)

(56) References Cited

U.S. PATENT DOCUMENTS 2,490,554 A * 12/1949 Snyder ............... H02K 49/12
192/21.5
2,796,571 A * 6/1957 Dunn ................. H02K 21/44
310/112
(Continued)

FOREIGN PATENT DOCUMENTS

DE    10 2010 002 401 A1    10/2010
EP            0186954 A1 *  7/1986 ............. H02K 7/116
(Continued)

OTHER PUBLICATIONS

International Search Report, issued in PCT/FI2016/050200, dated Sep. 9, 2016.
(Continued)

*Primary Examiner* — Mohamad A Musleh
(74) *Attorney, Agent, or Firm* — Birch, Stewart, Kolasch & Birch, LLP

(57) ABSTRACT

A rotor for a permanent magnet machine includes first and second axially successive rotor sections each including permanent magnets generating magnetic field having a pole pitch. The rotor includes a first coupling system for connecting the first rotor section to a shaft and a second coupling system for connecting the second rotor section to the shaft or to the first rotor section. The second rotor section is rotatable with respect to the first rotor section by an angle corresponding to the pole pitch in response to releasing the second coupling system so as to set the stator flux-linkages generated by the first and second rotor sections to be substantially zeroes. Thereafter, the permanent magnets do (Continued)

not substantially induce voltages on the stator windings even if the rotor is rotating during for example an internal fault of stator windings.

15 Claims, 7 Drawing Sheets

(51) Int. Cl.
| | |
|---|---|
| H02K 1/28 | (2006.01) |
| H02K 21/02 | (2006.01) |
| F01D 5/06 | (2006.01) |
| H02K 1/30 | (2006.01) |
| B63J 3/02 | (2006.01) |
| B63H 23/24 | (2006.01) |
| F01D 5/30 | (2006.01) |
| B63J 3/00 | (2006.01) |

(52) U.S. Cl.
CPC .............. *H02K 1/2753* (2013.01); *H02K 1/28* (2013.01); *H02K 1/30* (2013.01); *H02K 21/029* (2013.01); *B63H 23/24* (2013.01); *B63J 2003/002* (2013.01); *F01D 5/3053* (2013.01); *H02K 2201/06* (2013.01); *H02K 2213/09* (2013.01)

(58) Field of Classification Search
CPC ....... H02K 16/02; H02K 2201/06; B63J 3/02; B63J 2003/002; F01D 5/066; F01D 5/3053; B63H 23/24
See application file for complete search history.

(56) References Cited

U.S. PATENT DOCUMENTS

| | | | |
|---|---|---|---|
| 3,310,693 A * | 3/1967 | Aronoff ................ H02K 49/00 |
| | | | 310/104 |
| 5,780,944 A * | 7/1998 | Sakamoto ............. H02K 37/14 |
| | | | 310/156.26 |
| 6,191,561 B1 | 2/2001 | Bartel | |
| 2010/0213779 A1* | 8/2010 | Hochhalter .......... H02K 21/029 |
| | | | 310/156.24 |
| 2010/0213885 A1 | 8/2010 | Ichiyama | |
| 2010/0252341 A1 | 10/2010 | Shu et al. | |
| 2013/0169099 A1* | 7/2013 | Saban ................... H02K 1/278 |
| | | | 310/156.12 |

FOREIGN PATENT DOCUMENTS

| | | |
|---|---|---|
| EP | 1 055 282 A1 | 11/2000 |
| EP | 1 916 758 A2 | 4/2008 |
| FR | 2 191 329 A1 | 2/1974 |
| JP | 2006-271031 A | 10/2006 |
| JP | 2007221881 A * | 8/2007 |
| WO | WO-9734357 A1 * | 9/1997 .............. H02K 7/06 |
| WO | WO 99/37017 A1 | 7/1999 |
| WO | WO 2009/036179 A1 | 3/2009 |

OTHER PUBLICATIONS

Written Opinion of the International Searching Authority, issued in PCT/FI2016/050200, dated Sep. 9, 2016.

* cited by examiner

PERMANENT MAGNET MACHINE

CROSS REFERENCE To RELATED APPLICATIONS:

This application is the National Phase of PCT International Application No. PCT/FI2016/050200, filed on Mar. 31, 2016, which claims priority under 35 U.S.C. 119(e) to U.S. Provisional Application No. 62/145,225, filed on Apr. 09, 2015, all of which are hereby expressly incorporated by reference into the present application.

FIELD OF THE DISCLOSURE

The disclosure relates to a permanent magnet machine that can be, for example but not necessarily, a marine shaft generator or an electrical machine of another system where the electrical machine cannot be separated from a mechanical power line even in case of a winding fault. Furthermore, the disclosure relates to a rotor for a permanent magnet machine and to a method for deactivating a permanent magnet machine.

BACKGROUND

An inherent advantage of a permanent magnet machine is the good efficiency because permanent magnets generate magnetic field without losses in contrast to electromagnets. On the other hand, a permanent magnet machine is not free from challenges when the permanent magnet machine is a marine shaft generator or an electrical machine of another system where the electrical machine cannot be separated from a mechanical power line even in a case of a winding fault. In conjunction with typical permanent magnet machines, one of the challenges is related to the fact that the magnetic field generated by the permanent magnets induces voltages to the stator windings also during a fault, e.g. a turn-to-turn fault, of the stator windings when the rotor of the permanent magnet machine is rotating. This may cause fault currents which, in turn, may lead to a risk situation.

A straightforward approach would be to keep the permanent magnet machine stopped, i.e. non-rotating, after the fault has occurred but in all cases this is not possible. For example a propulsion shaft of a ship is allowed be stopped only for a relatively short time defined by regulations. Thus, a permanent magnet shaft generator should be deactivated within the relatively short time during which the propulsion shaft is allowed be stopped. There are basically the following two options to deactivate the permanent magnet shaft generator: a) disconnecting the rotor mechanically from the propulsion shaft and b) eliminating the magnetic field caused by the permanent magnets. Disconnecting the rotor mechanically from the propulsion shaft is a demanding task and might take a too long time depending on the construction and space available. Normally, eliminating the magnetic field caused by the permanent magnets, i.e. demagnetizing the permanent magnets, requires heat and/or strong external counter acting magnetic field or combination of these two. This, of course, would also destroy the permanent magnets.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying and non-limiting embodiments of the invention.

In accordance with the invention, there is provided a new rotor for a permanent magnet machine that can be, for example but not necessarily, a marine shaft generator that is assembled on/around a propulsion shaft of a ship. A rotor according to the invention comprises:
- a first rotor section comprising first permanent magnets generating magnetic field having a pole pitch,
- a second rotor section comprising second permanent magnets generating magnetic field having the same pole pitch, the first and second rotor sections being axially successive, and
- a first coupling system for connecting the first rotor section to a shaft and a second coupling system for connecting the second rotor section to the shaft or to the first rotor section.

The second rotor section is rotatable with respect to the first rotor section by an angle corresponding to the pole pitch in response to releasing the second coupling system so as to set the stator flux-linkages generated by the first and second permanent magnets to be substantially zeroes. After the second rotor section has been rotated by the angle corresponding to the pole pitch, the permanent magnets do not substantially induce voltages on the stator windings even if the rotor is rotating.

The above-mentioned second coupling system may comprise for example shear pins between the first and second rotor sections. The shear pins can be broken or removed in a fault situation, and thus the second rotor section can be made rotatable with respect to the first rotor section. The shear pins can be provided for example with bolt heads so that each shear pin can be broken by twisting the shear pin under consideration. It is also possible that the second coupling system comprises bolts between the first and second rotor sections. The bolts can be removed with e.g. a motorized tool quickly in a fault situation. It is also possible that each of the first and second rotor sections is separately connected to the shaft for example with a chronicle coupling so that the same magnetic poles are axially aligned. In a fault situation, one of the rotor sections is rotated by the angle corresponding to the pole pitch with respect to the other rotor section so that opposite magnetic poles of the rotor sections get aligned when seen in the axial direction.

In accordance with the invention, there is provided also a new permanent magnet machine that comprises a rotor according to the invention and a stator.

In accordance with the invention, there is provided also a new method for deactivating a permanent magnet machine whose rotor comprises: axially successive first and second rotor sections, a first coupling system for connecting the first rotor section to a shaft, and a second coupling system for connecting the second rotor section to the shaft or to the first rotor section. A method according to the invention comprises:
- releasing the second coupling system so as to make the first and second rotor sections rotatable with respect to each other, and
- rotating the first and second rotor sections with respect to each other by an angle corresponding to the pole pitch of the magnetic fields generated by permanent magnets of the first and second rotor sections so as to set the magnetic flux-linkages generated by the first and second rotor sections on the stator windings of the permanent magnet machine to be substantially zeroes.

The principle of the above-described method can be deemed to be a new way to eliminate stator flux-linkages generated by a permanent magnet rotor.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
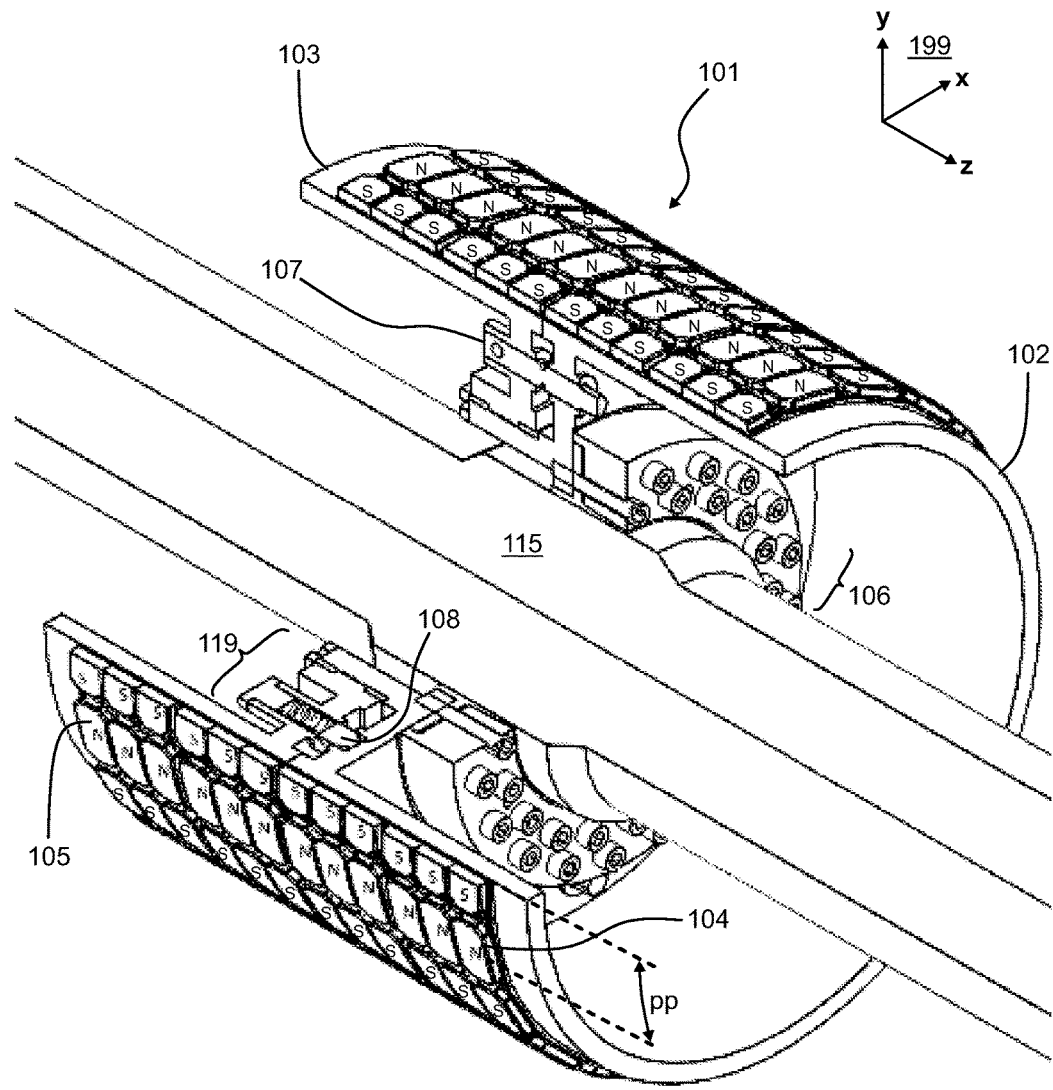
FIGS. 1a-1j illustrate a permanent magnet rotor according to an exemplifying and non-limiting embodiment of the invention.
Figure 1B:
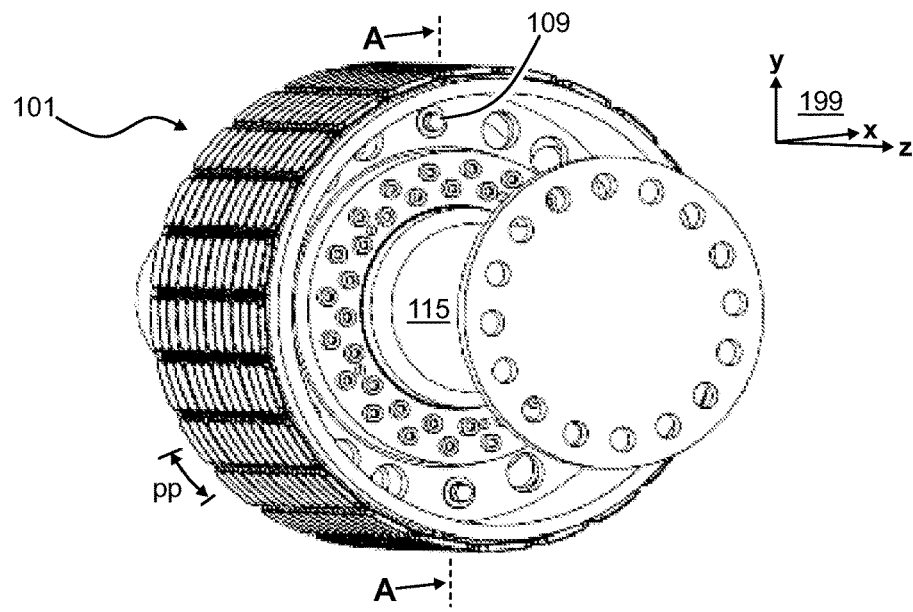
Figure 1C:
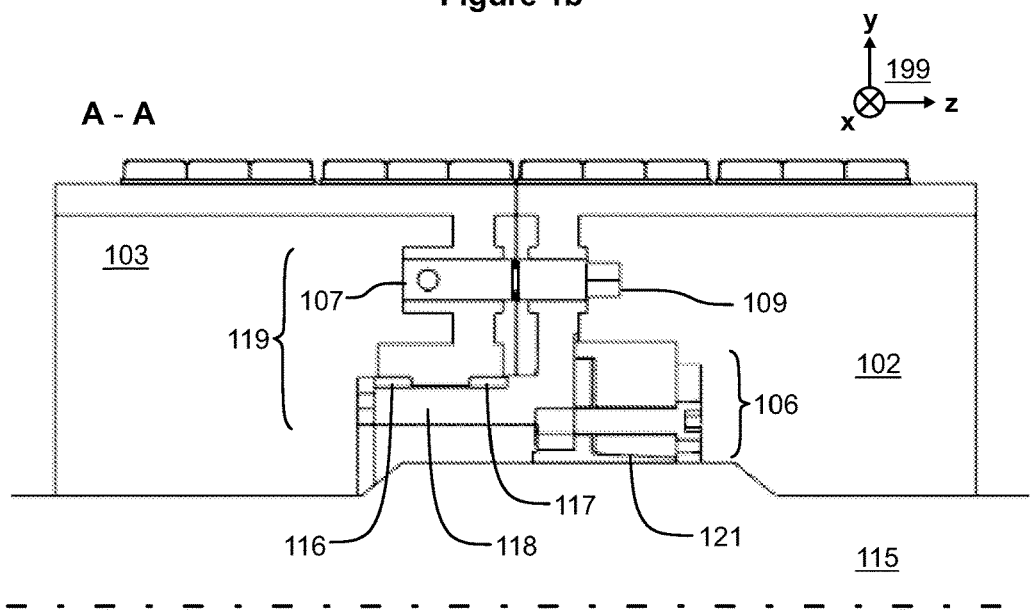

FIG. 1a shows a partial section view of a rotor 101 according to an exemplifying and non-limiting embodiment of the invention for a permanent magnet machine. The rotational axis of the rotor 101 is parallel with the z-axis of a coordinate system 199. One of the section planes related to the partial section view is parallel with the xz-plane of the coordinate system 199 and the other of the section planes is parallel with the yz-plane of the coordinate system 199 so that the section planes coincide with the rotational axis of the rotor. FIG. 1b shows an isometric view of the rotor 101 and FIG. 1c shows a part of a section taken along a line A-A shown in FIG. 1b. The section plane related to FIG. 1c is parallel with the yz-plane of the coordinate system 199. The viewing directions related to FIGS. 1a-1c are illustrated by the coordinate system 199 shown in each of the FIGS. 1a-1c.

The rotor 101 comprises a first rotor section 102 that comprises first permanent magnets generating magnetic field having a pole pitch pp. In FIG. 1a, one of the first permanent magnets is denoted with a figure reference 104. The pole pitch pp is illustrated in FIGS. 1a and 1b. The rotor 101 comprises a second rotor section 103 that comprises second permanent magnets generating magnetic field having the same pole pitch pp. In FIG. 1a, one of the second permanent magnets is denoted with a figure reference 105. In FIG. 1a, each permanent magnet which is denoted with letter 'N' has its north-pole facing away from the rotational axis of the rotor and its south-pole facing towards the rotational axis of the rotor. Correspondingly, each permanent magnet which is denoted with letter 'S' has its south-pole facing away from the rotational axis of the rotor and its north-pole facing towards the rotational axis of the rotor. As can be seen from FIGS. 1a-1c, the first and second rotor sections 102 and 103 are successive in the axial direction, i.e. in the z-direction of the coordinate system 199.

The rotor 101 comprises a first coupling system 106 for fixing the first rotor section 102 to a shaft 115. In the exemplifying case illustrated in FIGS. 1a-1c, the first coupling section 106 comprises coupling elements having conical surfaces so that one of the coupling elements is radially pressed against the shaft when the coupling elements are axially pressed against each other with bolts. In FIG. 1c, the above-mentioned conical surfaces are denoted with a figure reference 121.

Figure 1D:
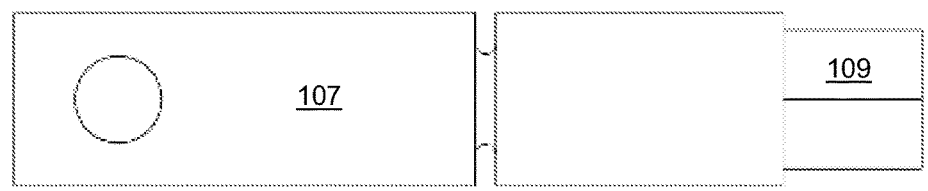

The rotor 101 comprises a second coupling system 119 for connecting the second rotor section 103 to the first rotor section 102. In this exemplifying case, the second coupling system 119 comprises an arrangement where the second rotor section 103 is rotatably supported by a center part 118 of the first rotor section 102. It is, however, also possible that second coupling system 119 comprises an arrangement where the second rotor section 103 is directly supported by the shaft 115. In this exemplifying case, the second rotor section 103 is rotatably supported by the center part 118 with the aid of bushings 116 and 117 made of bronze or other suitable bearing material. It is also possible that the cylindrical face surface of the center part 118 or the cylindrical face surface of the second rotor section 103 is coated with bronze or other suitable bearing material. The bushings 116 and 117, or the corresponding coating, reduce friction and prevent fretting corrosion. The second coupling system 119 further comprises shear pins for connecting the first and second rotor sections 102 and 103 to each other in a torque transferring way. In FIGS. 1a and 1c, one of the shear pins is denoted with a figure reference 107. The shear pin 107 is shown in FIG. 1d, too. In this exemplifying rotor, a first end of each shear pin is shaped to be twistable with a tool, e.g. a socket wrench, and a second end of each shear pin is non-rotatably locked to the second rotor section 103 so as to make the shear pins breakable by twisting the first ends of the shear pins. In FIGS. 1c and 1d, the first end of the shear pin 107 is denoted with a figure reference 109. The first end 109 of the shear pin 107 is shown in FIG. 1b, too. The first end of each shear pin can be provided for example with a hexagonal bolt head as illustrated in FIGS. 1c and 1d. Instead of the shear pins, it is also possible to use bolts for connecting the first and second rotor sections 102 and 103 to each other in a torque transferring way.

The second rotor section 103 can be arranged to be rotatable with respect to the first rotor section 102 by breaking the above-mentioned shear pins. After the shear pins have been broken, the second rotor section 103 is rotatably supported by the above-mentioned bushings 116 and 117. In a case of a fault, the second rotor section 103 is made rotatable with respect to the first rotor section 102 and then the second rotor section 103 is rotated by the angle corresponding to the pole pitch pp with respect to the first rotor section 102 so that opposite magnetic poles of the first and second rotor sections get aligned when seen in the axial direction. As a corollary, the stator flux-linkages become substantially zeroes and thus the rotor can be allowed to rotate without causing a considerable risk of further damages.

Figure 1E:
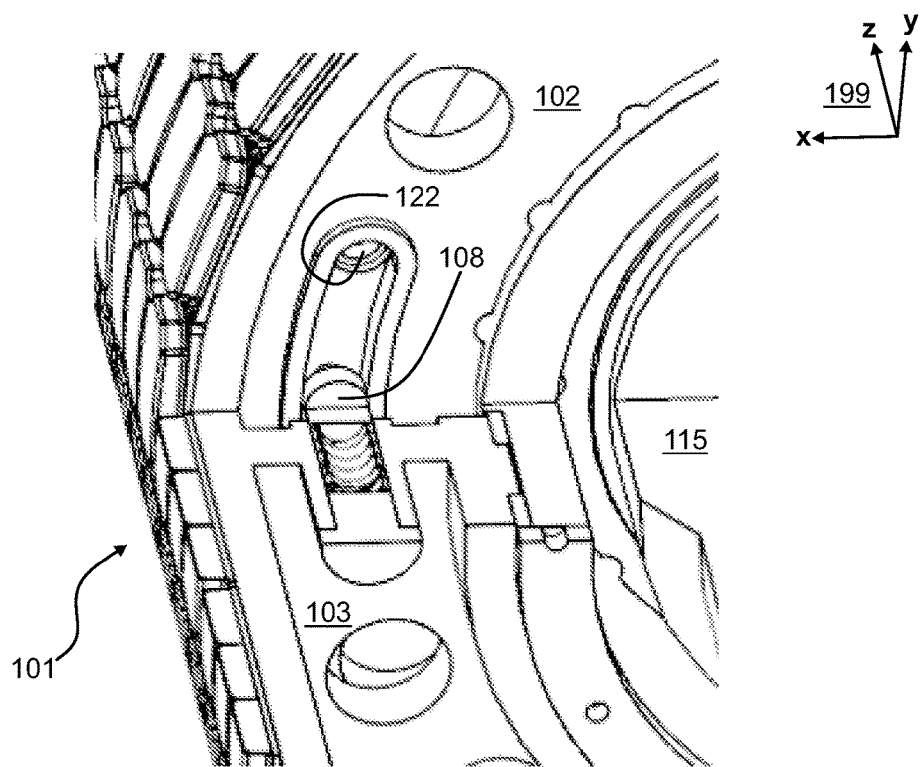
Figure 1F:
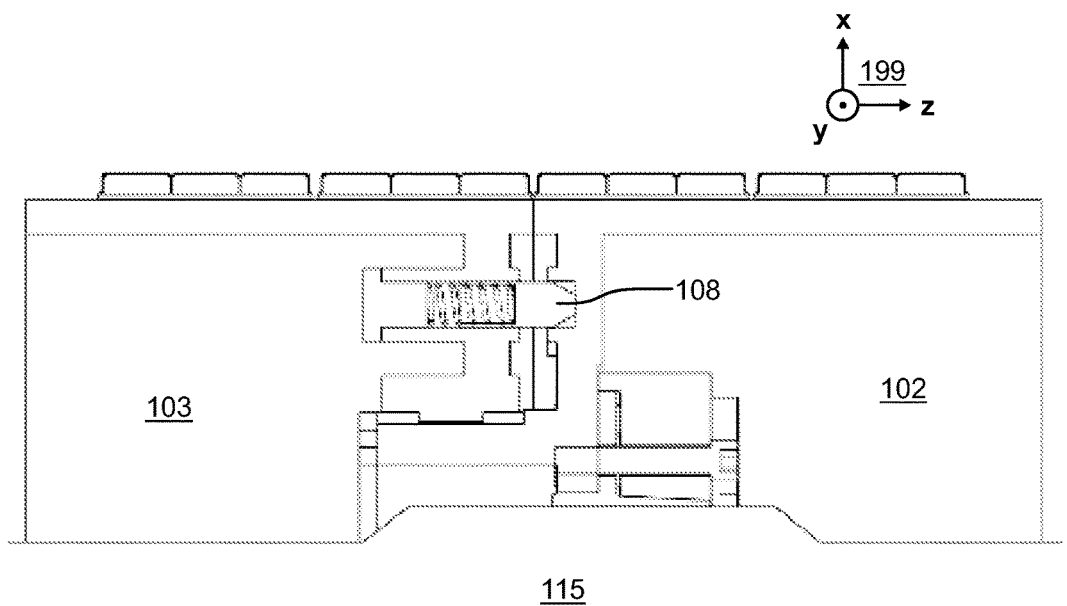

The exemplifying rotor 101 further comprises spring loaded locking devices for locking the second rotor section 103 with respect to the first rotor section 102 in response to a situation in which the second rotor section has been rotated by the angle corresponding to the pole pitch pp with respect to the first rotor section. FIG. 1e illustrates a portion of the rotor 101. FIG. 1e shows a part of the surface of the first rotor section 102 facing axially towards the second rotor section 103. Furthermore, FIG. 1e shows a section view of a part of the second rotor section 103 where the section plane is parallel with xz-plane of the coordinate system 199 and coincides with the rotational axis of the rotor. FIG. 1f shows a section view of a part of the rotor where the section plane parallel with xz-plane of the coordinate system 199 and coincides with the rotational axis of the rotor. In FIGS. 1e and 1f, one of the above-mentioned spring loaded locking devices is denoted with a figure reference 108. The tip of the spring loaded locking device 108 is in an arched groove that has locking pits at its both ends. In FIG. 1e, one of the locking pits is denoted with a figure reference 122. When the second rotor section 103 rotates with respect to the first rotor section 102 so that the tip of the spring loaded locking device 108 gets aligned with the locking pit 122, the spring shown in FIGS. 1e and 1f pushes the tip of the spring loaded locking device 108 into the locking pit 122 in the axial direction, and thus the second rotor section 103 is locked with respect to the first rotor section 102.

Figure 1G:
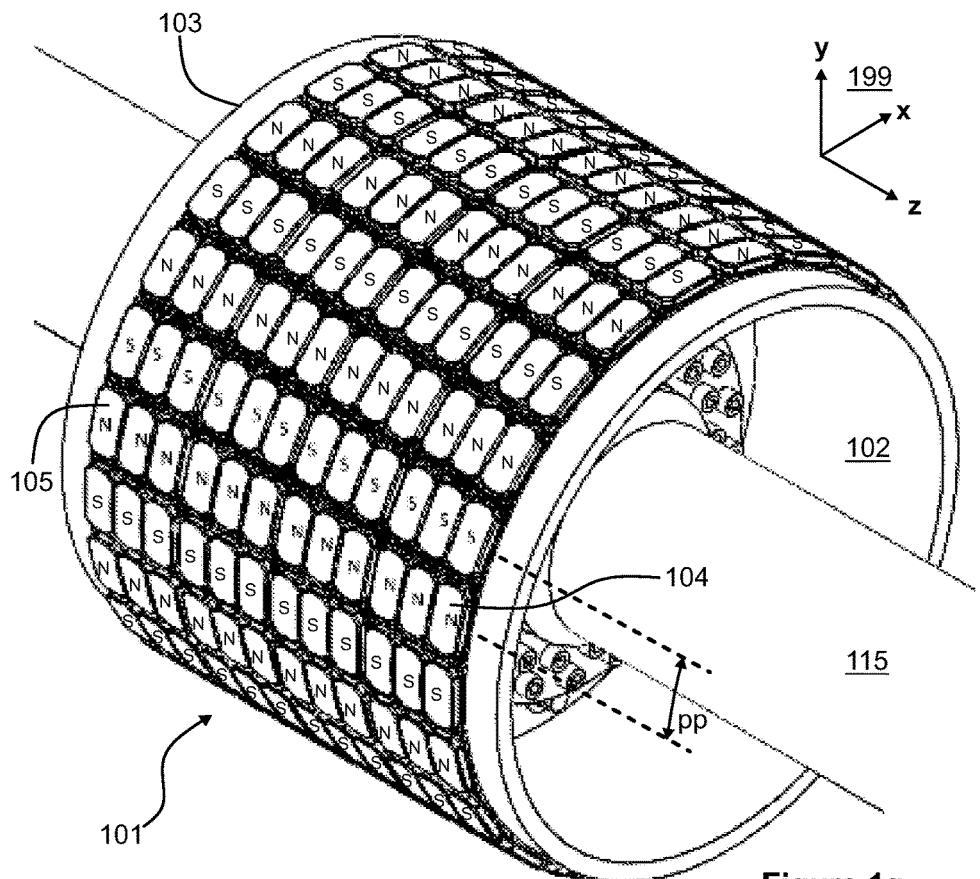
Figure 1H:
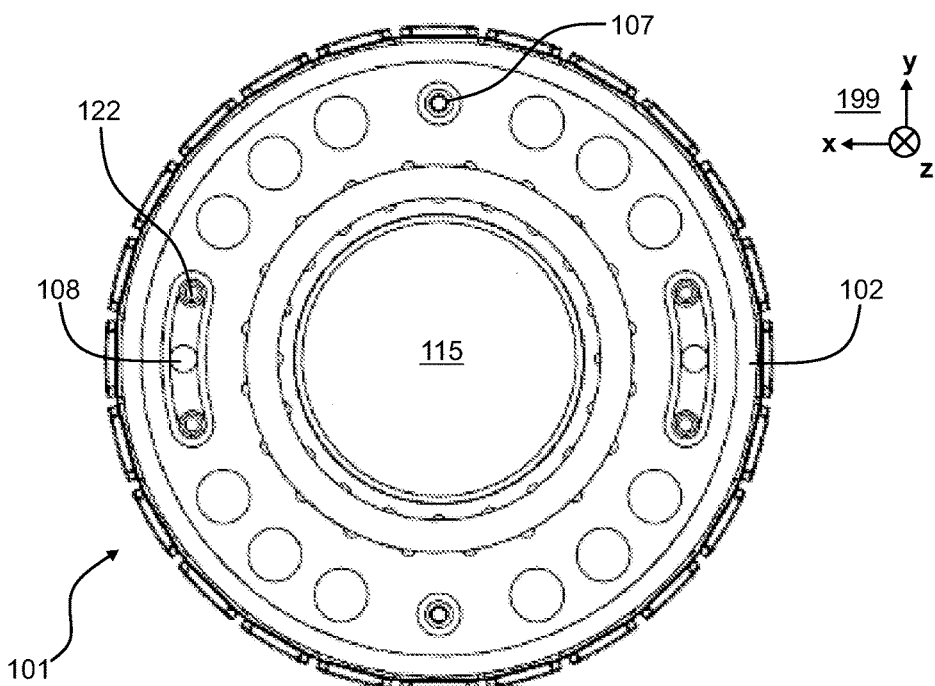
Figure 1I:
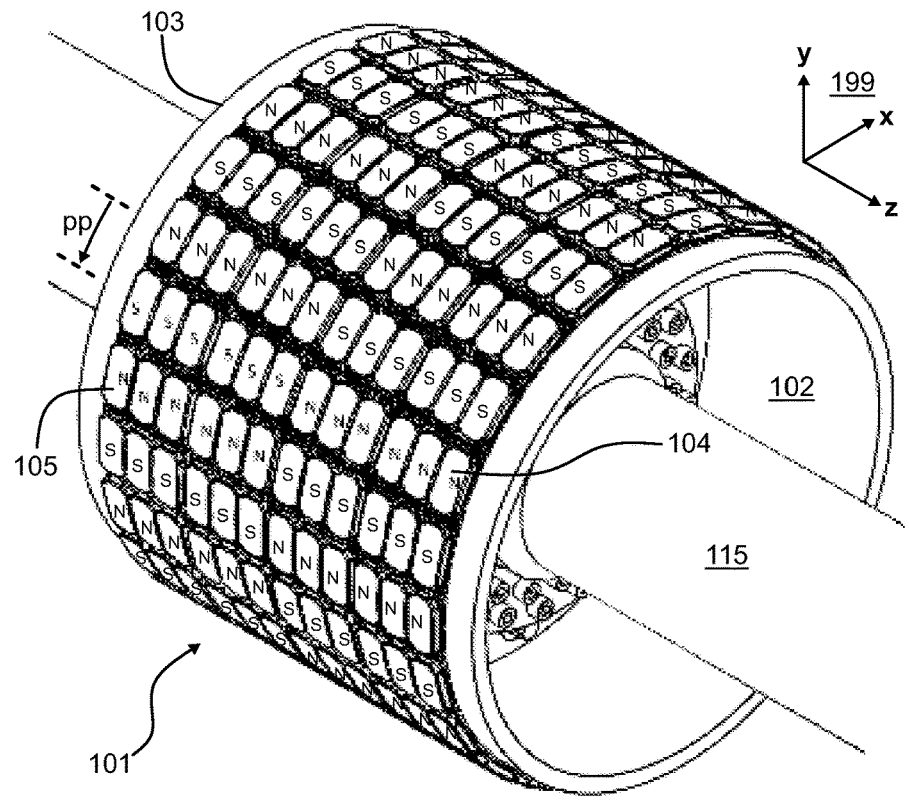
Figure 1J:
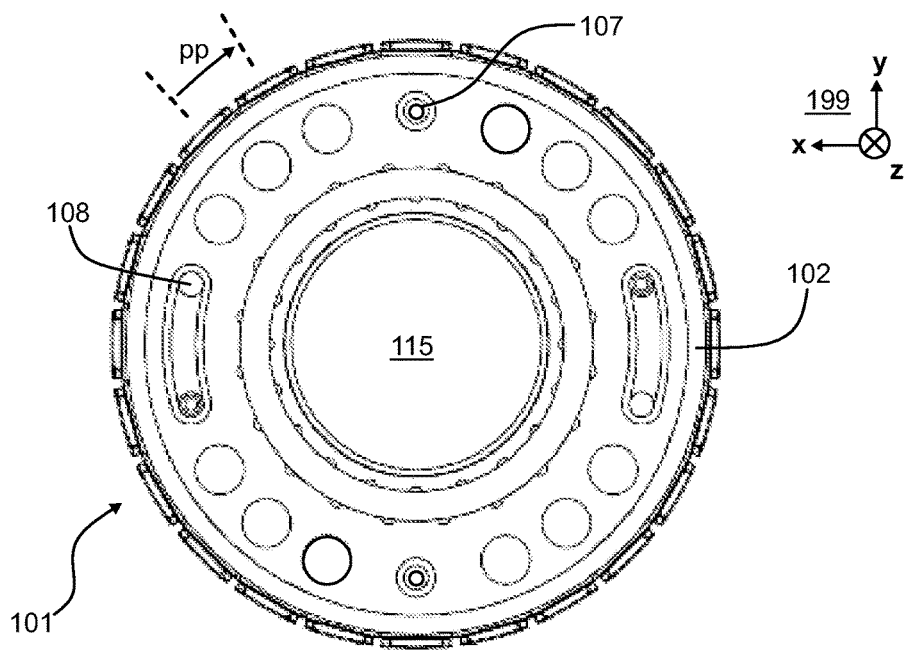

FIG. 1g illustrates the rotor 101 in its normal operational mode where the north-poles N of the permanent magnets of the first and second rotor sections 102 and 103 are aligned with each other when seen in the axial direction i.e. in the z-direction, and correspondingly the south-poles S of the permanent magnets of the first and second rotor sections 102 and 103 are aligned with each other when seen in the axial direction. FIG. 1h shows the surface of the first rotor section 102 facing towards the second rotor section 103. Furthermore, FIG. 1h shows the position of the spring loaded locking device 108 with respect to the first rotor section 102, and a cross-section of the shear pin 107. FIG. 1i illustrates the rotor 101 in a flux-cancelling mode where the second rotor section 103 has been rotated by the angle corresponding to the pole pitch pp with respect to the first rotor section 102 so that opposite magnetic poles of the first and second rotor sections are aligned when seen in the axial direction i.e. in the z-direction. FIG. 1j shows the surface of the first rotor section 102 facing towards the second rotor section 103 in the flux-cancelling mode illustrated in FIG. 1i. As can be seen from FIG. 1j, the spring loaded locking device 108 has moved to an end of the arched groove. In FIG. 1j, the figure reference 107 means a broken surface of the shear pin 107 whereas in FIG. 1 the figure reference 107 means a cross-section of the unbroken shear pin 107.

It is worth noting that a rotor according to an exemplifying and non-limiting embodiment of the invention may comprise more than two axially successive rotor sections. The above-presented principle for setting stator flux-linkages substantially zeroes is applicable also in cases where there are more than two axially successive rotor sections, e.g. four axially successive rotor sections that can be rotated with respect to each other in a fault situation. Furthermore, the mechanical connections between the rotor sections and the shaft and the possibility to rotate the rotor sections with respect to each other may be implemented also with different means than those presented above.

Figure 2A:
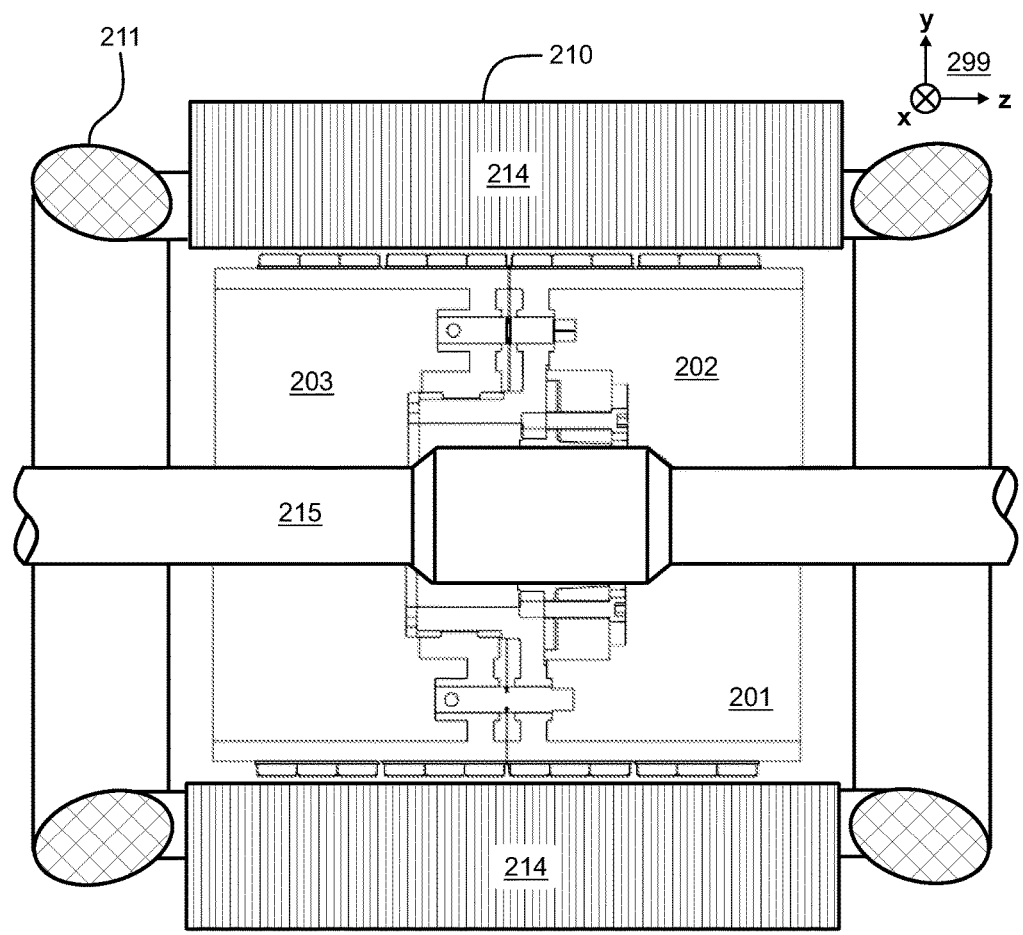
FIG. 2a illustrates a permanent magnet machine according to an exemplifying and non-limiting embodiment of the invention.

FIG. 2a illustrates a permanent magnet machine according to an exemplifying and non-limiting embodiment of the invention. The permanent magnet machine comprises a stator 210 and a rotor 201 that is rotatably supported with respect to the stator. The bearings for rotatably supporting the rotor 201 with respect to the stator 210 are not shown in FIG. 2a. The rotor 201 comprises axially successive rotor sections 202 and 203, and the rotor 201 is connected to a shaft 215 in a torque transferring way. The rotor 201 can be for example such as described above with reference to FIGS. 1a-1j. The stator 210 comprises stator windings 211 and a stator core structure 214. The stator core structure 214 comprises advantageously a stack of ferromagnetic sheets stacked in the axial direction of the permanent magnet machine, i.e. in the z-direction of a coordinate system 299.

Figure 2B:
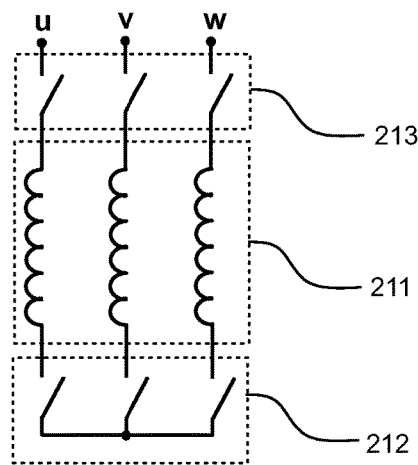
FIG. 2b shows a circuit diagram of stator windings of a permanent magnet machine according to an exemplifying and non-limiting embodiment of the invention.

In a permanent magnet machine according to an exemplifying and non-limiting embodiment of the invention, the stator windings 211 comprise star-connected phase-windings. The permanent magnet machine may further comprise a switch between each of the phase-windings and the star point of the star-connected phase-windings. FIG. 2b shows a circuit diagram of the stator windings in an exemplifying case where the star-connected phase-windings constitute a three-phase winding. In FIG. 2b, the switches between the phase-windings and the star point are denoted with a figure reference 212. The permanent magnet machine may further comprise a switch at each of electrical terminals for connecting the permanent magnet machine to an external electrical system. In FIG. 2b, the switches at the electrical terminals u, v, and w are denoted with a figure reference 213.

Figure 3:
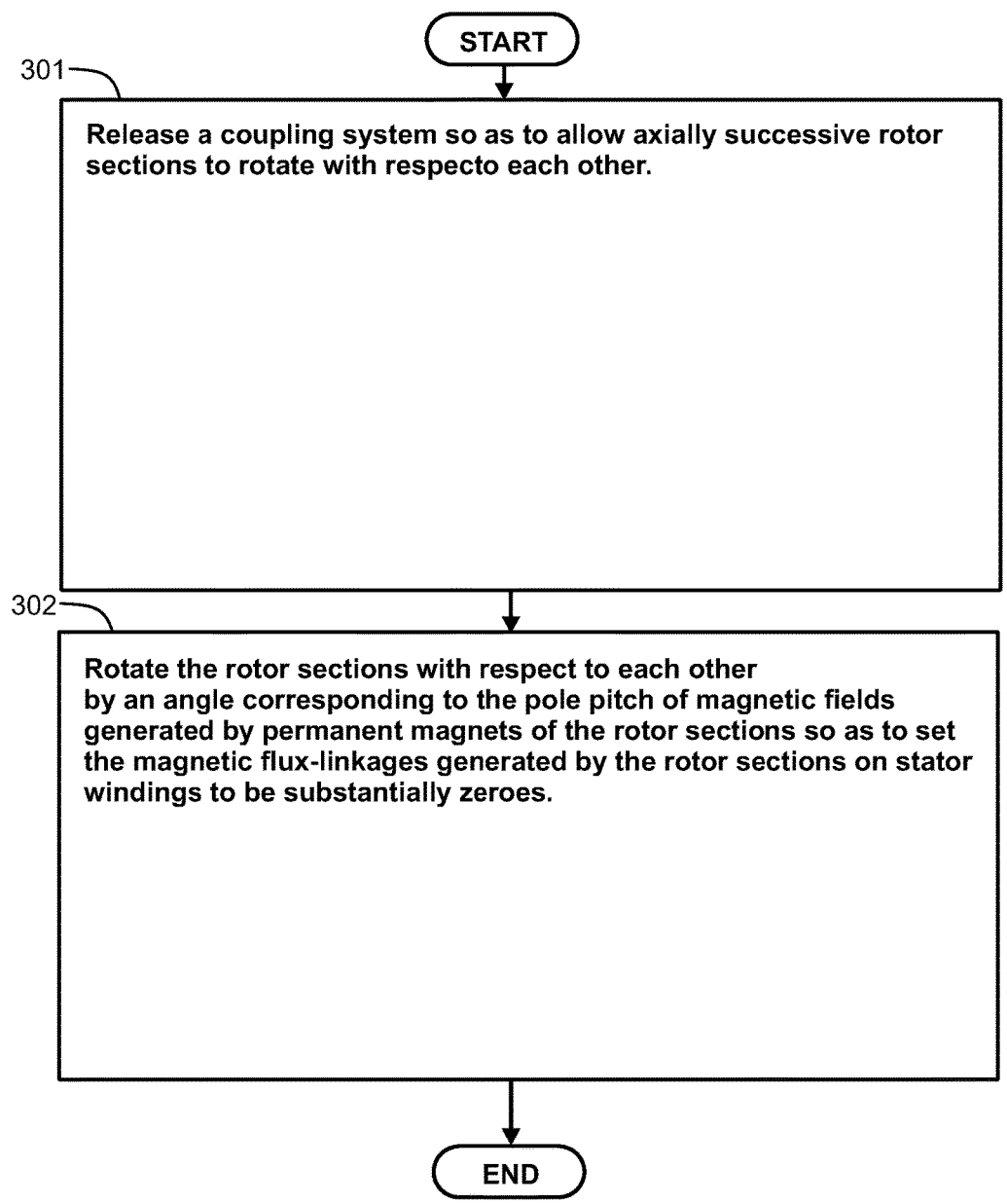
FIG. 3 shows a flowchart of a method according to an exemplifying and non-limiting embodiment of the invention for deactivating a permanent magnet machine according to an exemplifying and non-limiting embodiment of the invention.

FIG. 3 illustrates a flowchart of a method according to an exemplifying and non-limiting embodiment of the invention for deactivating a permanent magnet machine whose rotor comprises: axially successive first and second rotor sections, a first coupling system for connecting the first rotor section to a shaft, and a second coupling system for connecting the second rotor section to the shaft or to the first rotor section. The method comprises the following actions:

- action 301: releasing the second coupling system so as to make the first and second rotor sections rotatable with respect to each other, and subsequently
- action 302: rotating the first and second rotor sections with respect to each other by an angle corresponding to the pole pitch of the magnetic fields generated by permanent magnets of the first and second rotor sections so as to set the magnetic flux-linkages generated by the first and second rotor sections on the stator windings of the permanent magnet machine to be substantially zeroes.

In a method according to an exemplifying and non-limiting embodiment of the invention, the first and second rotor sections are locked to each other with the aid of at least one spring loaded locking device after the second rotor section has been rotated by the angle corresponding to the pole pitch with respect to the first rotor section.

In a method according to an exemplifying and non-limiting embodiment of the invention, the releasing the second coupling system comprises breaking one or more shear pins which connect, when being unbroken, the first and second rotor sections to each other in a torque transferring way.

In a method according to an exemplifying and non-limiting embodiment of the invention, each of the shear pins is broken by twisting a first end of the shear pin under consideration with a tool, the first end of each shear pin being shaped to be twistable with the tool and a second end of each shear pin being non-rotatably locked to one of the first and second rotor sections so as to make the shear pins breakable by twisting the first ends of the shear pins.

In a method according to an exemplifying and non-limiting embodiment of the invention, the releasing the second coupling system comprises removing one or more bolts which connect the first and second rotor sections to each other in a torque transferring way.

In a marine application where the permanent magnet machine is a shaft generator assembled on/around a propulsion shaft of a ship, a method according to an exemplifying and non-limiting embodiment of the invention may comprise for example the following actions:
1) stopping the engine driving the shaft,
2) opening engine side service hatches of the shaft generator,
3) locating shear pins or other means locking the first and second rotor sections to each other,
4) breaking the shear pins or deactivating the above-mentioned other means so as to stop torque transfer between the first and second rotor sections,
5) starting the engine—because of fluctuating torque of the engine, e.g. a two-stroke diesel, and the inertia of the second rotor section, the flywheel effect forces the second rotor section to rotate in relation to the first rotor section, and
6) locking, with spring loaded locking devices, the second rotor section to the first rotor section in a rotational position that deviates by one pole pitch from the original mutual rotational position of the first and second rotor sections.

In the rotational position locked by the spring loaded locking devices, the stator flux-linkages are substantially zeroes and thus the permanent magnets do not substantially induce voltages on the stator windings even if the rotor is rotating.

Thus, the fault currents are substantially zeroes.

A permanent magnet machine comprising a rotor according to FIGS. 1a-1j was tested. In the normal operational mode illustrated in FIG. 1g, the no-load electromotive force "EMF" induced the by permanent magnets on the stator windings is about 500 $V_{RMS}$ at the nominal rotational speed. In the flux-cancellation mode illustrated in FIG. 1i where the rotor sections have been rotated by one pole pitch with respect to each other, the no-load electromotive force induced the by permanent magnets on the stator windings is less than 5 $V_{RMS}$ at the nominal rotational speed. Thus, the no-load electromotive force in the flux-cancellation mode is less than 1% of the no-load electromotive force in the normal operational mode. For the sake of comparison, it is worth mentioning that in a standard electrically excited synchronous machine the no-load electromotive force when the excitation is switched off is typically significantly higher than 1% of the no-load electromotive force corresponding to the nominal excitation. This is due to remanence flux in the ferromagnetic rotor core of the electrically excited synchronous machine.

The specific examples provided in the description given above should not be construed as limiting the scope and/or the applicability of the appended claims. Lists and groups of examples provided in the description given above are not exhaustive unless otherwise explicitly stated.

What is claimed is:

1. A rotor for a permanent magnet machine, the rotor comprising:
   a first rotor section comprising first permanent magnets generating magnetic field having a pole pitch,
   a second rotor section comprising second permanent magnets generating magnetic field having the same pole pitch, the first and second rotor sections being axially successive, and
   a first coupling system for connecting the first rotor section to a shaft and a second coupling system for connecting the second rotor section to the shaft or to the first rotor section,
   wherein the second rotor section is rotatable with respect to the first rotor section by an angle corresponding to the pole pitch in response to releasing the second coupling system so as to set magnetic flux-linkages generated by the first and second permanent magnets on stator windings of the permanent magnet machine to be substantially zeroes.

2. The rotor according to claim 1, wherein the rotor further comprises at least one spring loaded locking device for locking the second rotor section with respect to the first rotor section in response to a situation in which the second rotor section has been rotated by the angle corresponding to the pole pitch with respect to the first rotor section.

3. The rotor according to claim 1, wherein the second coupling system comprises one or more shear pins for connecting the first and second rotor sections to each other.

4. The rotor according to claim 3, wherein a first end of each of the shear pins is shaped to be twistable with a tool and a second end of each of the shear pins is non-rotatably locked to one of the first and second rotor sections so as to make the shear pins breakable by twisting the first ends of the shear pins.

5. The rotor according to claim 4, wherein the first end of each of the shear pins is provided with a bolt head.

6. The rotor according to claim 1, wherein the second coupling system comprises one or more bolts for connecting the first and second rotor sections to each other.

7. A permanent magnet machine comprising:
   a stator, and
   a rotor,
   wherein the rotor comprises:
   a first rotor section comprising first permanent magnets generating magnetic field having a pole pitch,
   a second rotor section comprising second permanent magnets generating magnetic field having the same pole pitch, the first and second rotor sections being axially successive, and
   a first coupling system for connecting the first rotor section to a shaft and a second coupling system for connecting the second rotor section to the shaft or to the first rotor section,
   wherein the second rotor section is rotatable with respect to the first rotor section by an angle corresponding to the pole pitch in response to releasing the second coupling system so as to set magnetic flux-linkages generated by the first and second permanent magnets on stator windings of the permanent magnet machine to be substantially zeroes.

8. The permanent magnet machine according to claim 7, wherein the stator comprises star-connected phase-windings and the permanent magnet machine further comprises a switch between each of the phase-windings and a star point of the star-connected phase-windings.

9. The permanent magnet machine according to claim 7, wherein the permanent magnet machine further comprises a switch at each of electrical terminals for connecting the permanent magnet machine to an external electrical system.

10. A method for deactivating a permanent magnet machine whose rotor comprises: axially successive first and second rotor sections, a first coupling system for connecting the first rotor section to a shaft, and a second coupling system for connecting the second rotor section to the shaft or to the first rotor section, the method comprising:
 releasing the second coupling system so as to make the first and second rotor sections rotatable with respect to each other, and
 rotating the first and second rotor sections with respect to each other by an angle corresponding to a pole pitch of magnetic fields generated by permanent magnets of the first and second rotor sections so as to set magnetic flux-linkages generated by the first and second rotor sections on stator windings of the permanent magnet machine to be substantially zeroes.

11. The rotor according to claim 2, wherein the second coupling system comprises one or more shear pins for connecting the first and second rotor sections to each other.

12. The rotor according to claim 11, wherein a first end of each of the shear pins is shaped to be twistable with a tool and a second end of each of the shear pins is non-rotatably locked to one of the first and second rotor sections so as to make the shear pins breakable by twisting the first ends of the shear pins.

13. The rotor according to claim 12, wherein the first end of each of the shear pins is provided with a bolt head.

14. The rotor according to claim 2, wherein the second coupling system comprises one or more bolts for connecting the first and second rotor sections to each other.

15. The permanent magnet machine according to claim 8, wherein the permanent magnet machine further comprises a switch at each of electrical terminals for connecting the permanent magnet machine to an external electrical system.

\* \* \* \* \*